(12) United States Patent
Seo

(10) Patent No.: US 8,244,095 B2
(45) Date of Patent: Aug. 14, 2012

(54) DIGITAL BROADCAST RECEIVER AND DATA BROADCAST CONTENT PROCESSING METHOD

(75) Inventor: Kwang Min Seo, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 1197 days.

(21) Appl. No.: 11/726,252

(22) Filed: Mar. 21, 2007

(65) Prior Publication Data

US 2008/0046955 A1  Feb. 21, 2008

(30) Foreign Application Priority Data

Aug. 21, 2006  (KR) .......................... 10-2006-0078693

(51) Int. Cl.
*H04N 9/80* (2006.01)
*H04N 5/92* (2006.01)

(52) U.S. Cl. ........................................ 386/240; 386/326

(58) Field of Classification Search .................. 386/291, 386/297, 326, 248, 249, 252
See application file for complete search history.

(56) References Cited

U.S. PATENT DOCUMENTS

| | | | |
|---|---|---|---|
| 6,675,385 B1 * | 1/2004 | Wang .............................. | 725/39 |
| 2003/0221197 A1 | 11/2003 | Fries et al. | |
| 2005/0086700 A1 * | 4/2005 | Tachikawa ..................... | 725/112 |
| 2007/0079340 A1 * | 4/2007 | McEnroe ........................ | 725/78 |
| 2007/0174871 A1 * | 7/2007 | Kim et al. ....................... | 725/41 |

FOREIGN PATENT DOCUMENTS

| | | |
|---|---|---|
| EP | 0 828 388 | 3/1998 |
| EP | 1 662 682 | 5/2006 |
| GB | 2 398 467 | 8/2004 |
| GB | 2 399 726 | 9/2004 |
| JP | 2003-274379 | 9/2003 |
| KR | 1020060010957 | 2/2006 |
| WO | WO 02/085021 | 10/2002 |
| WO | WO 2004/102844 | 11/2004 |

OTHER PUBLICATIONS

"Digital Audio Broadcasting (DAB); Broadcast Website; Part 1: User Application Specification , ETSI TS 101 498-1", ETSI Standards, Jan. 2006.
"Digital Audio Broadcasting (DAB); Broadcast Website; Part 2: Basic Profile Specification; ETSI TS 101 498-2", ETSI Standards, Sep. 2000.
"Digital Audio Broadcasting (DAB); Broadcast Website; Part 3: TopNews Basic Profile Specification, ETSI TS 101 498-3", ETSI Standards, Oct. 2005.
"Digital Audio Broadcasting (DAB); Multimedia Object Transfer (MOT) Protocol; Final Draft ETSI EN 301 234", ETSI Standards, Feb. 2005.

* cited by examiner

*Primary Examiner* — Robert Chevalier
(74) *Attorney, Agent, or Firm* — The Farrell Law Firm, P.C.

(57) ABSTRACT

A digital broadcast receiver and data broadcast content processing method for the same are disclosed. The method includes receiving and displaying contents of a broadcast web site (BWS); selecting a displayed content for storage; storing the content selected for storage in a state existing at the time of selection; selecting a stored content for reproduction; and reproducing the content selected for reproduction. As a result, the user can store desired broadcast content in a memory unit during viewing of BWS contents, and reproduce desired content stored in the memory unit on a screen when necessary.

13 Claims, 5 Drawing Sheets

DIGITAL BROADCAST RECEIVER AND DATA BROADCAST CONTENT PROCESSING METHOD

PRIORITY

This application claims priority to an application entitled "DIGITAL BROADCAST RECEIVER AND DATA BROADCAST CONTENT PROCESSING METHOD" filed in the Korean Intellectual Property Office on Aug. 21, 2006 and assigned Serial No. 2006-0078693, the contents of which are incorporated herein by reference.

BACKGROUND OF THE INVENTION

1. Field of the Invention

The present invention relates generally to a digital broadcast receiver and, more particularly, to a digital broadcast receiver and a data broadcast content processing method for the same wherein contents of a broadcast web site (BWS) can be stored during data broadcast reception and reproduced later.

2. Description of the Related Art

In digital broadcasting, a broadcasting station broadcasts a digitally modulated multimedia signal including audio, video and text. Broadcast receivers receive and reproduce the broadcast, multimedia signal. Digital multimedia broadcasting (DMB) and digital video broadcasting (DVB) are examples of digital broadcasting. DMB may be divided into terrestrial DMB or satellite DMB.

Recently, to extend multimedia features, advanced portable terminals, such as mobile communication terminals, notebooks and personal digital assistants, have been equipped with multimedia-oriented processors.

Digital broadcasting can provide various data services, for example, a broadcast web site (BWS) service and a slide show of still images based on a multimedia object transfer (MOT) protocol, an electronic program guide (EPG) based on the extensible markup language (XML) or voices, a real-time travel and traffic information service based on a Transport Protocol Experts Group (TPEG) protocol, and other interactive service.

In a BWS service, web site content, such as web pages and image files, is transmitted to digital broadcast receivers using the MOT protocol. A digital broadcast receiver receives and temporarily stores broadcast BWS content in order to deliver a web service to a user in a manner similar to normal web browsing, but without a reverse channel.

In a BWS service, fixed data is repeatedly transmitted at regular intervals. However, because the data may be transmitted in a modified form owing to certain circumstances of a corresponding broadcasting station, a user may have difficulty in selecting and storing desired BWS content. BWS content may also contain links to different pages, making it difficult for the user to store the BWS content together with linked pages.

In a BWS service, a large amount of content is broadcast at once, making it difficult to browse all the content during data broadcast reception. To use a desired BWS content, the user is inconvenienced by having to connect to a predetermined broadcast channel. Further, if the BWS content is changed in substance in between channel connection periods, the changed content may be of no value to the user.

SUMMARY OF THE INVENTION

The present invention has been made in view of at least the above problems, and an object of the present invention is to provide a digital broadcast receiver and data broadcast content processing method wherein the user can store desired content during viewing of contents of a broadcast web site (BWS).

Another object of the present invention is to provide a digital broadcast receiver and data broadcast content processing method wherein the user can readily reproduce desired stored BWS content.

In accordance with the present invention, there is provided a data broadcast content processing method for a digital broadcast receiver, that includes receiving and displaying contents of a broadcast web site; selecting a displayed content for storage; storing the content selected for storage in a state existing at the time of selection; selecting a stored content for reproduction; and reproducing the content selected for reproduction.

In accordance with the present invention, there is provided a data broadcast content processing method for a digital broadcast receiver, that includes selecting a content to be reproduced from stored contents of a broadcast web site; creating directory information of the selected content; creating a reproduction mapping table on the basis of the created directory information; and displaying a beginning page of the selected content according to the reproduction mapping table.

In accordance with the present invention, there is provided a data broadcast content processing method for a digital broadcast receiver, that includes storing a selected content from contents of a broadcast web site being viewed; selecting a stored content to be reproduced; and reproducing the selected content.

In accordance with the present invention, there is provided a digital broadcast receiver that includes a display unit for displaying received contents of a broadcast web site; a storage selector for selecting a displayed content for storage; a memory unit for storing the selected content in a state existing at the time of selection; a reproduction selector for selecting a stored content for reproduction; and a content reproducer for displaying the content selected for reproduction through the display unit.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF PREFERRED EMBODIMENTS

Figure 1:
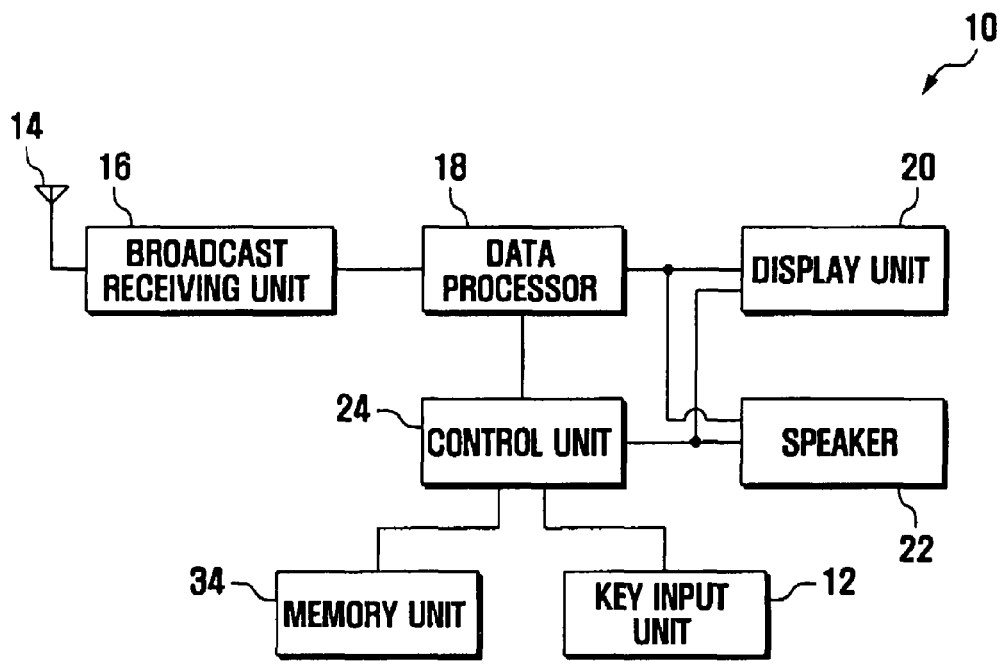
FIG. 1 illustrates a configuration of a digital broadcast receiver according to the present invention.

Hereinafter, preferred embodiments of the present invention are described in detail with reference to the accompanying drawings. The same reference symbols identify the same or corresponding elements in the drawings. Some constructions or processes known in the art may be not described to avoid obscuring the invention in unnecessary detail.

Figure 2:
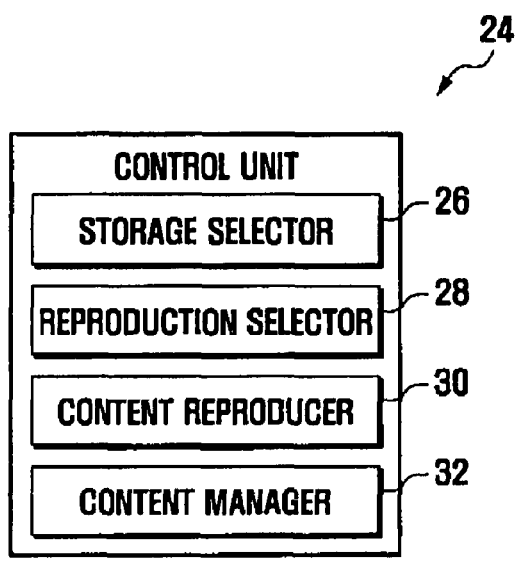
FIG. 2 illustrates a control unit of the digital broadcast receiver of FIG. 1.

FIG. 1 illustrates a configuration of a digital broadcast receiver according to the present invention, and FIG. 2 illustrates a control unit of the digital broadcast receiver.

Referring to FIGS. 1 and 2, the digital broadcast receiver 10 includes a key input unit 12, a broadcast receiving unit 16, a data processor 18, a display unit 20, a speaker 22, a control unit 24, and a memory unit 34.

The key input unit 12 includes a plurality of keys for manipulating the digital broadcast receiver 10, and generates a key value corresponding to a key input from the user and sends the generated key value to the control unit 24. The user may enter command keys to store, reproduce or manage BWS content.

The broadcast receiving unit 16 receives a digitally modulated broadcast signal through an antenna 14, and demodulates the received broadcast signal into digital broadcast data. The broadcast receiving unit 16 receives a signal carrying BWS content and demodulates the signal into BWS content data.

The data processor 18 decodes content data from the broadcast receiving unit 16. The data processor 18 decodes the content data according to the MOT protocol into a web-based content and directory. The data processor 18 also decompresses the content data if necessary.

The display unit 20 and speaker 22 output content data decoded by the data processor 18 for reproduction. The display unit 20 displays the decoded content data in the form of web pages.

The memory unit 34 includes a read only memory (ROM), random access memory (RAM), and a flash memory. The ROM stores operation control programs and various reference data of the digital broadcast receiver 10, and may be an erasable programmable ROM (EPROM). The RAM acts as a working memory for the control unit 24, and may be a static RAM (SRAM). The flash memory stores updateable archive data, and also stores data generating from control operations of the control unit 24 or from utilization of the digital broadcast receiver 10. The flash memory may be a NAND type flash memory device. In particular, executable programs for storing, reproducing, and managing content are stored in the ROM. Periodically received content data is temporarily stored in the RAM or flash memory. A content selected by the user is stored in the flash memory.

The control unit 24 controls individual components of the digital broadcast receiver 10 to store, reproduce, and manage BWS contents. In particular, the control unit 24 temporarily stores content data received in real-time from the broadcasting station in the memory unit 34. When the user terminates content viewing, the temporarily stored content data is removed from the memory unit 34. Because identical content data is repeatedly received, the control unit 24 controls the temporary store operation so that content data having a particular identifier (ID) is not overwritten by another content data having the same ID.

As illustrated in FIG. 2, to perform content processing functions, the control unit 24 includes a storage selector 26, a reproduction selector 28, a content reproducer 30, and a content manager 32. The storage selector 26 selects a content being displayed, and stores the selected content in the memory unit 34. The reproduction selector 28 selects a content stored in the memory unit 34 for reproduction, and the content reproducer 30 reproduces the selected stored content on a screen of the display unit 20. The content manager 32 performs management functions such as removing stored content from the memory unit 34 and renaming stored content.

After the selection of content to be stored, the storage selector 26 blocks reception of broadcast data related to the selected content, and freezes the selected content in its existing state at the time of selection.

For efficient storage of a selected content in the memory unit 34, the storage selector 26 also creates group labels and a mapping table. Because content data may be composed of multiple folders and files, the storage selector 26 creates group labels to manage these folders and files. The storage selector 26 creates a storage mapping table for storage of a selected content on the basis of directory information of the selected content, and stores the selected content in the memory unit 34 according to the storage mapping table. Thereafter the storage selector 26 displays a storage completion indicator on the display unit 20 to notify the user of the completion of the content storage.

For efficient reproduction of content selected by the reproduction selector 28, the content reproducer 30 creates directory information and a reproduction mapping table. The content reproducer 30 creates directory information of the selected content, and creates a reproduction mapping table for reproduction of the selected content on the basis of the directory information. The content reproducer 30 displays a beginning page of the selected content on the screen of the display unit 20 according to the reproduction mapping table. The beginning page may be changed according to the reproduction mapping table, and may be set to a desired page contained in the selected content. For example, a page of the selected content displayed on the screen or the home page thereof at the time of storage may be assigned as the beginning page.

The memory unit 34 stores content selected by the user. Stored content corresponds to content data temporarily stored at the time of selection for storage, and includes linked pages. As described above, whereas temporarily stored content is automatically removed without user intervention, content stored by user selection can only be removed by a user command through the key input unit 12.

Figure 3:
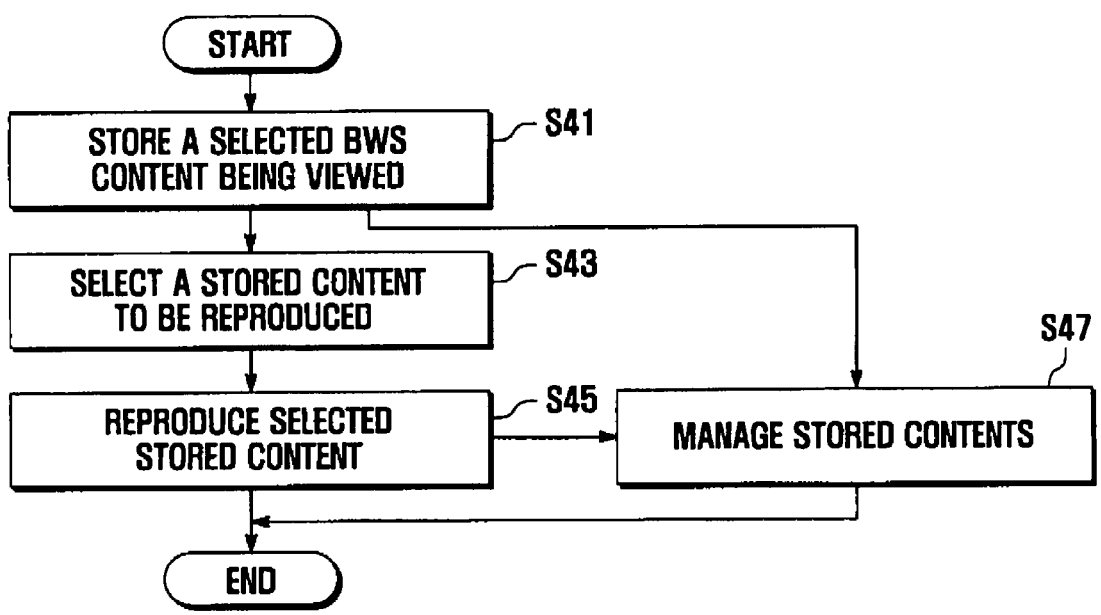
FIG. 3 is a flow chart illustrating steps of a data broadcast content processing method according to the present invention.

FIG. 3 is a flow chart illustrating steps of a data broadcast content processing method according to the present invention. Referring to FIGS. 1 and 3, the method is described below.

The data broadcast content processing method includes a content storage step S41, a content selection step S43 for reproduction, a content reproduction step S45, and a content management step S45 for managing stored contents.

BWS content being viewed by the user through the digital broadcast receiver 10 is selected through the key input unit 12 and stored in the memory unit 34 at step S41. Content stored in the memory unit 34 is then selected for reproduction at step S43. The selected content is reproduced through the display unit 20 and speaker 22 at step S45. Management operations, such as removing a stored content from the memory unit 34 and renaming stored content, are performed at step S47.

Figure 4:
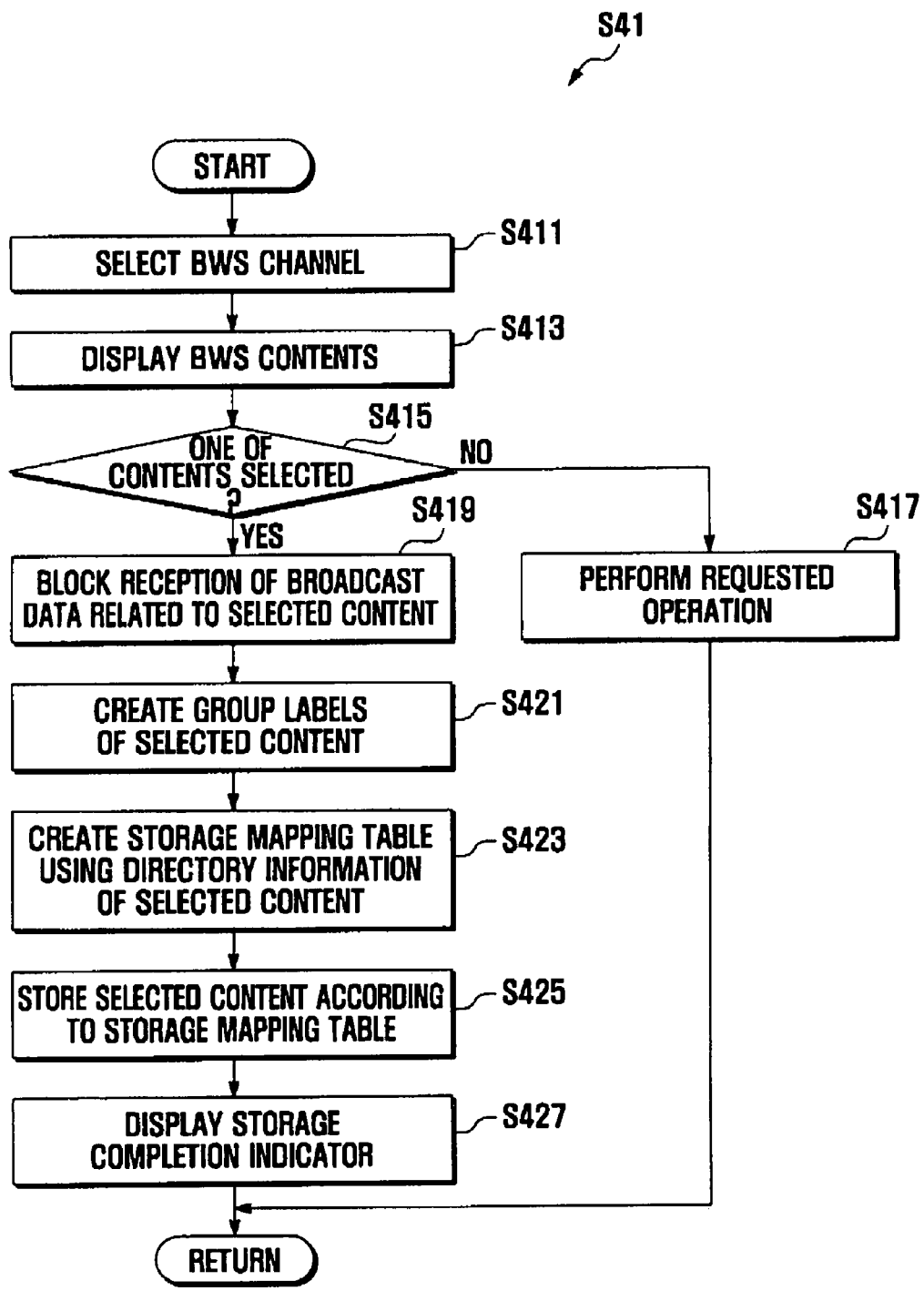
FIG. 4 is a flow chart illustrating a content storage step in the method of FIG. 3.

FIG. 4 is a flow chart illustrating the content storage step S41 in FIG. 3. Referring to FIGS. 1 and 4, step S41 is described below.

When the user tunes to a desired BWS channel in data broadcasting through the key input unit 12 at step S411, the digital broadcast receiver 10 displays received BWS contents on the screen of the display unit 20 at step S413. The user views the contents displayed on the screen. The memory unit 34 temporarily stores content data received at regular intervals, and updates the temporarily stored content data if necessary.

The control unit 24 determines if a particular command is input from the user through the key input unit 12 at step S415. If a content selection command is input, the storage selector 26 moves a portion of the temporarily stored content data corresponding to the selected content to a non-volatile section of the memory unit 34. If a command other than the content selection command is input, the control unit 24 performs a requested function at step S417.

Upon selection of the content to be stored, the storage selector 26 blocks reception of broadcast data related to the selected content to freeze the selected content in its existing state at the time of selection at step S419. This is because content data temporarily stored in the memory unit 34 is repeatedly received at regular intervals and updated if necessary, and thereby data inconsistency may be caused.

A content signal or content data that is received by the antenna 14 before blocking of broadcast data reception, but that is not yet temporarily stored in the memory unit 34, may be ignored or be temporarily stored in the memory unit 34 via the broadcast receiving unit 16 and data processor 18.

The storage selector 26 creates group labels to manage the selected content at step S421, creates a storage mapping table for storage of the selected content on the basis of directory information of the selected content at step S423, and stores the selected content in the memory unit 34 according to the storage mapping table at step S425. Thereafter, the storage selector 26 displays a storage completion indicator to notify the user of completion of storing the selected content at step S427.

The content stored in the memory unit 34 according to user selection includes a page displayed on the screen at the time of selection, and may further include the home page of the stored content and linked pages.

Figure 5:
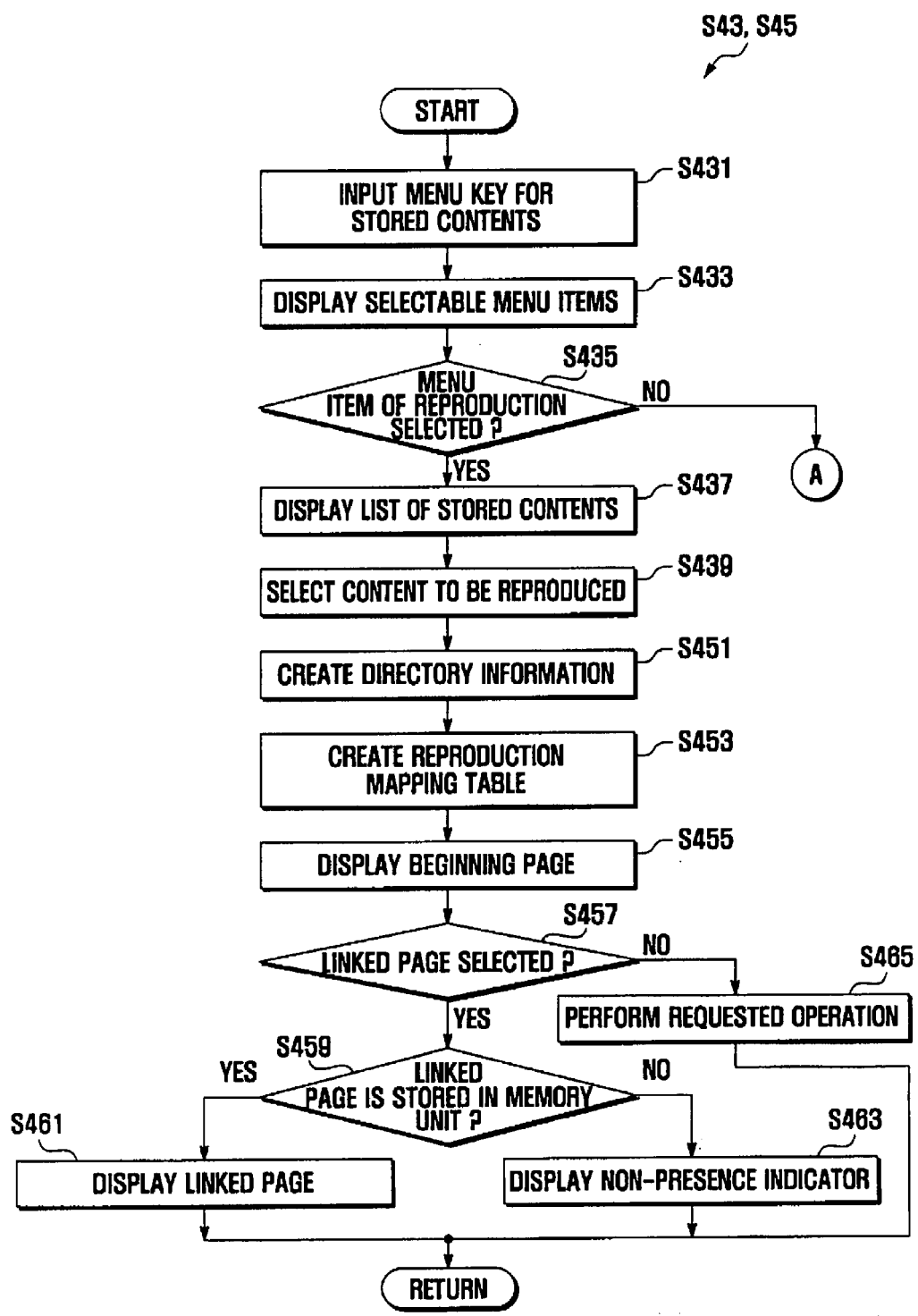
FIG. 5 is a flow chart illustrating content selection and reproduction steps in the method of FIG. 3.

FIG. 5 is a flow chart illustrating the content selection step S43 and the content reproduction step S45 in FIG. 3. Referring to FIGS. 1 and 5, steps S43 and S45 are described below.

When the user selects a stored content menu after inputting a menu key at step S431, the display unit 20 displays a reproduction menu item and management menu item under the control of the control unit 24 at step S433, and determines if the reproduction menu item is selected at step S435.

If the reproduction menu item is selected through the key input unit 12, the reproduction selector 28 displays on the screen of the display unit 20 a list of contents stored in the memory unit 34 at step S437.

When the user selects a content to be reproduced from the list at step S439, the content reproducer 30 creates directory information of the selected content at step S451, and creates a reproduction mapping table for reproduction of the selected content on the basis of the directory information at step S453. Thereafter, the content reproducer 30 displays a beginning page of the selected content on the screen according to the reproduction mapping table at step S455.

During reproduction of the selected content, the control unit 24 determines if the user selects a linked page through the key input unit 12 at step S457.

If the user selects a linked page, the control unit 24 determines if the linked page is stored in the memory unit 34 at step S459. If the linked page is stored in the memory unit 34, the control unit 24 controls display of the linked page on the screen at step S461. If the linked page is not stored in the memory unit 34, the control unit 24 controls display of a corresponding non-presence indicator on the screen at step S463.

If a key other than the key of linked page selection is determined to be input at step S457, the control unit 24 performs a requested operation at step S465.

Figure 6:
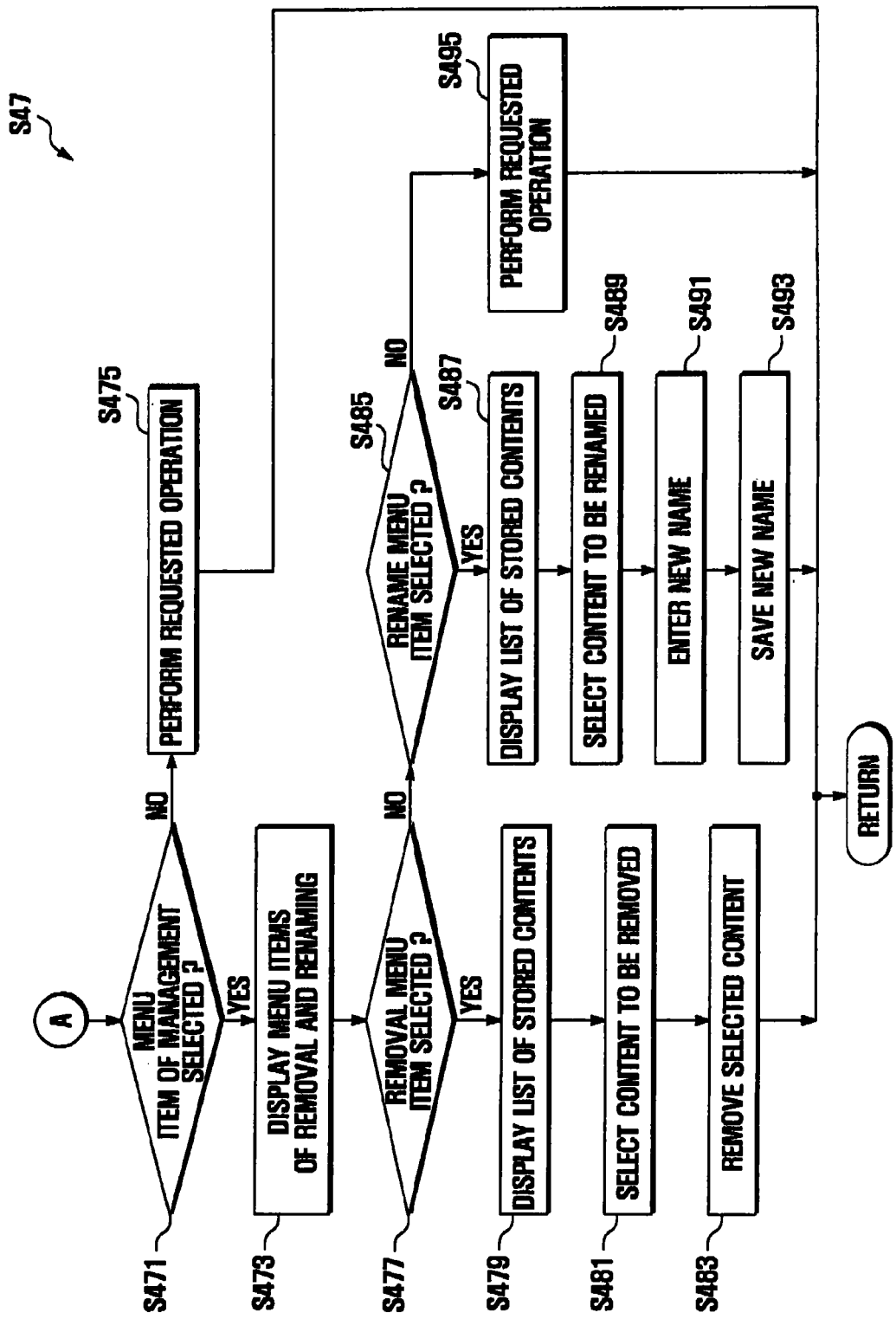
FIG. 6 is a flow chart illustrating a content management step in the method of FIG. 3.

FIG. 6 is a flow chart illustrating the content management step S47 in FIG. 3. Referring to FIGS. 1 and 6, step S47 is described below.

The control unit 24 determines if the management menu item is selected at step S471. If the management menu item is selected, the control unit 24 displays on the screen menu items of removal and renaming at step S473. If a menu item other than the management menu item is selected, the control unit 24 performs a requested operation at step S475.

The control unit 24 determines if the removal menu item is selected at step S477. If the removal menu item is selected, the content manager 32 displays a list of stored contents at step S479. When the user selects a content to be removed from the list at step S481, the content manager 32 removes the selected content from the memory unit 34 at step S483.

If the removal menu item is determined not to be selected at step S477, the control unit 24 determines if the rename menu item is selected at step S485. If the rename menu item is selected, the content manager 32 displays a list of stored contents at step S487. When content to be renamed is selected from the list at step S489, a name input box is displayed on the screen. The name input box may include an old name of the selected content. When the user enters a new name in the name input box at step S491 and saves the new name at step S493, the content manager 32 changes the name of the selected content from the old name to the new name.

If a menu item other than the rename menu item is determined to be selected at step S485, the control unit 24 performs a requested operation at step S495.

As apparent from the above description, the present invention provides a digital broadcast receiver and data broadcast content processing method for the same, wherein the user can store desired broadcast content in a memory unit during viewing of contents of a broadcast web site (BWS), and reproduce desired content stored in the memory unit on a screen when necessary. Content stored in the memory unit includes not only a page displayed on the screen at the time of selection for storage but also linked pages. Therefore the user can browse even linked pages during reproduction of stored content.

While preferred embodiments of the present invention have been shown and described in this specification, it will be understood by those skilled in the art that various changes or modifications of the embodiments are possible without departing from the spirit and scope of the invention as defined by the appended claims. For example, although, in the description, reception of broadcast data related to a selected content is blocked at the time of selection for storage, the reception may also be blocked after all linked pages are received.

What is claimed is:

1. A data broadcast content processing method for a digital broadcast receiver, comprising:
   receiving and displaying content of a broadcast web site;
   receiving a first selection of content from among the displayed content for storage;
   storing the first-selected content according to a state of the first-selected content existing at the time of the first selection;
   receiving a second selection of stored content for reproduction; and
   reproducing the second-selected content, wherein receiving and displaying the content of the broadcast web site includes temporarily storing the content of the broadcast web site, wherein the first-selected content includes a page of the broadcast web site displayed by the digital broadcast receiver when the displayed content for storage was selected, and a plurality of pages linked to the displayed page, the displayed page and the plurality of pages linked to the displayed page being in a state existing at a time of the first selection, and wherein the stored plurality of pages linked to the display page are displayed for reproduction of the second-selected content.

2. The data broadcast content processing method of claim 1, wherein receiving the first selection of content from among the displayed content for storage includes blocking reception of broadcast data related to the selected content.

3. The data broadcast content processing method of claim 2, wherein storing the first-selected content comprises:

creating group labels of the first-selected content;

creating a storage mapping table on the basis of directory information of the first-selected content;

storing the first-selected content according to the storage mapping table; and displaying a storage completion indicator on a screen.

4. The data broadcast content processing method of claim 3, wherein each stored content of the stored first-selected content contains linked pages.

5. The data broadcast content processing method of claim 4, wherein reproducing the second-selected content includes displaying a page contained in the second-selected content as an initial page.

6. The data broadcast content processing method of claim 5, wherein the initial page corresponds to a page of the second-selected content displayed on the screen or a home page of the second-selected content, at the time of storage.

7. The data broadcast content processing method of claim 6, wherein, in response to the selection of a page linked by the initial page, the page is displayed if the page is contained in the second-selected content.

8. The data broadcast content processing method of claim 7, wherein reproducing the second-selected content comprises:

creating directory information of the second-selected content;

creating a reproduction mapping table on the basis of the created directory information; and displaying an initial page of the second-selected content according to the reproduction mapping table.

9. The data broadcast content processing method of claim 1, further comprising managing the stored first-selected content by removing and renaming selected stored content from among the stored first-selected content.

10. A digital broadcast receiver comprising:

a display unit for displaying received contents of a broadcast web site;

a storage selector for receiving a first selection of content from among the displayed contents for storage;

a memory unit for storing the first-selected content according to a state of the first-selected content existing at the time of the first selection;

a reproduction selector for receiving a second selection of stored content for reproduction; and a content reproducer for displaying the second-selected content through the display unit, wherein the received contents of the broadcast web site are temporarily stored in the memory unit, wherein the first-selected content includes a page of the broadcast web site displayed by the digital broadcast receiver when the displayed content for storage was selected, and a plurality of pages linked to the displayed page, the displayed page and the plurality of pages linked to the displayed page being in a state existing at the time of the first-selection, and wherein the stored plurality of pages linked to the display page are displayed for reproduction of the second-selected content.

11. The digital broadcast receiver of claim 10, wherein each stored content of the first-selected content contains linked pages.

12. The digital broadcast receiver of claim 11, wherein the content reproducer displays a selected page contained in the second-selected content as an initial page.

13. The digital broadcast receiver of claim 10, further comprising a content manager for removing and renaming selected stored content from among the stored first-selected content.

* * * * *